Dec. 8, 1942.  G. A. LYON  2,304,584
WHEEL STRUCTURE
Filed Jan. 21, 1941
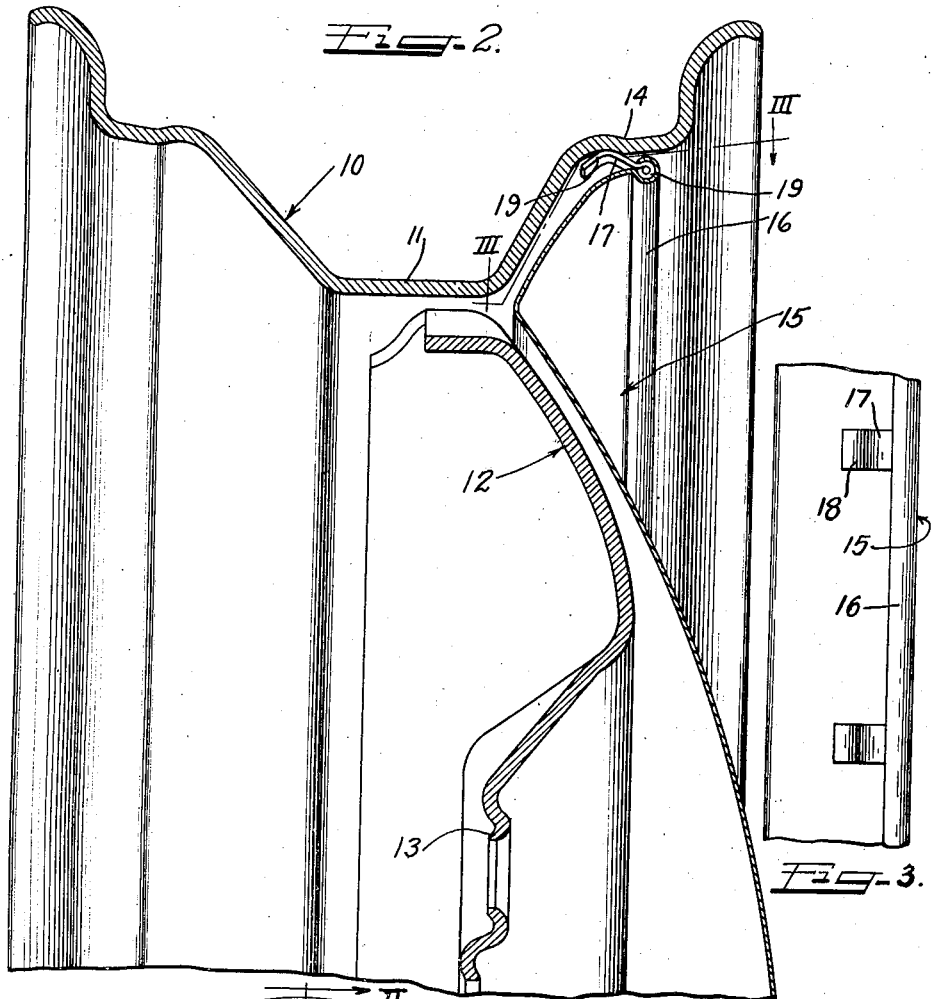
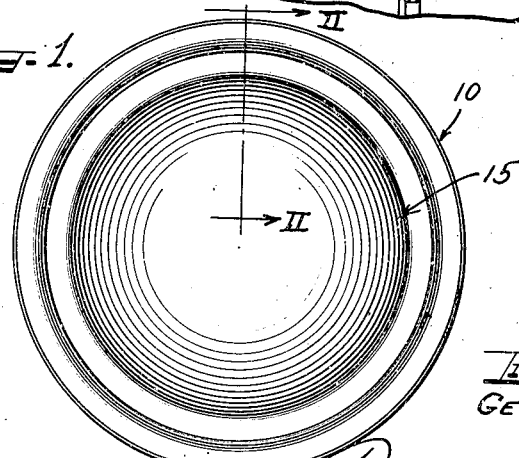
Inventor
GEORGE ALBERT LYON.

Patented Dec. 8, 1942

2,304,584

UNITED STATES PATENT OFFICE 2,304,584

WHEEL STRUCTURE

George Albert Lyon, Allenhurst, N. J.

Application January 21, 1941, Serial No. 375,173

3 Claims. (Cl. 301—37)

The present invention relates to a wheel structure, and more particularly to a novel means for retaining a wheel cover member either in the form of a disk or an annulus on the wheel.

An object of this invention is to provide a wheel structure wherein a depressed tire bead retaining portion of the wheel rim part may be utilized in the retention of a cover member on the wheel.

Another object of this invention is to provide improved spring retaining means for detachably and resiliently holding a wheel cover on an automobile wheel.

Still another object of this invention is to provide a cover with resilient retaining means of such construction that it will readily cooperate with a depressed tire bead retaining portion formed in the tire rim of a wheel.

In accordance with the general features of this invention, there is provided in a wheel structure including a body part and a multi-flanged drop center rim part, which includes an outer axially extending flange having a hump, a circular cover member having a rolled outer edge and having fastened to its outer marginal portion resilient retaining means positioned with their free extremities to the rear of the rolled edge and having their extremities slightly raised for yieldable snap-on cooperation with the hump in the tire rim.

In accordance with other features of this invention, I provide a wheel cover having its outer edge rolled in such a manner that the resilient retaining fingers may be fixedly secured to the cover by means of the rolled or turned edge.

Other objects and features of this invention will more fully appear from the following detailed description taken in connection with the accompanying drawing which illustrates several embodiments thereof, and in which:

Figure 1 is a front view of a wheel structure embodying the features of the invention;

Figure 2 is an enlarged fragmentary cross sectional view taken on the line II—II of Figure 1 looking in the direction indicated by the arrows; and Figure 3 is a fragmentary detailed view of the spring fingers taken on the line III—III of Figure 2 looking downwardly.

As shown on the drawing:

The reference character 10 designates generally a multi-flanged drop center type of tire rim which comprises one part of the illustrated wheel. This tire rim part includes a base flange 11 fastened by any suitable means to a central wheel body part or spider which is of convex-concave cross section and includes the usual central bolt-on flange 13 by means of which the wheel may be suitably fastened to a support or shaft assembly. The tire rim part 10 has one of its axially extending outer flanges provided with a depression which extends radially inwardly and as a consequence provides an annular hump or protuberance 14.

Each rim part is provided with two of these annular depressions, as shown in Figure 2, one on each side of the base flange, and spaced apart so as to have seated in them the tire bead of the tire disposed in the tire rim part. The purpose of these depressions, as is now known in the art, is to prevent sidewise shifting of the tire bead upon sudden rupture or deflation of the automobile tire.

It is an object of this invention to utilize one of these depressed sections or humps 14, namely, the outermost one when the wheel is mounted, as a means for aiding in the retention of a wheel cover member, designated generally by the reference character 15, on the wheel. The wheel cover member 15 may be made in the form of a solid disk or hub cap, as is shown in Figure 2, or may be in the form of an annulus.

The cover member is preferably stamped from relatively thin sheet metal such as stainless steel or the like and, of course, may be suitably ornamented as desired. Such a cover member may, for example, be made from sheet metal having a thickness of .020".

In the form of cover member illustrated in section in Figure 2 the cover member has a cross sectional shape conforming generally to the outer cross sectional configuration of the rim and body parts of the wheel. At its outer periphery, the cover member is provided with a rolled or turned edge 16 inside of which are retained a plurality of spring clips or fingers 17. These clips are illustrated in plan in Figure 3. Each of them includes an eyelet end 19 interlocked with the bead 16, which is rolled around the eyelet or sleeve end, and a free slightly humped end 19 adapted to resiliently embrace the rear side of the hump 14 when the cover is pressed home into retaining cooperation with the wheel. The free bent ends 19 of the series of spring fingers or clips are all arranged in a common circle which normally is of a diameter slightly in excess of the inside diameter of the hump 14, so that these fingers must be deflected radially inwardly as they are passed over the hump 14. Even when the fingers are in retaining cooperation, they are still not in their normal position but are slightly deflected inwardly and as a consequence are under tension and apply a resilient cover retaining pressure to the rear side of the hump 14.

In the illustrated form of my invention the cover is easily applied to the wheel by merely pressing it axially into the position shown in Figure 2, at which time the retaining means are in cooperation with the rear side of the hump 14 of the tire rim part 10. To remove the cover all that is necessary to do is to insert a pry-off tool or screwdriver under the outer rolled edge and to then exert a fulcrumed pry-off pressure against the cover; the fulcrum for the pry-off tool being the rim part 10 itself.

I claim as my invention:

1. In a wheel structure, a wheel including a body and a multi-flanged drop center rim part, said rim part including an outer axially extending flange provided with a hump, and a metallic circular cover member having an inwardly turned marginal portion provided with spaced retaining fingers extending rearwardly therefrom, each of the fingers being flexible to pass over and into cover retaining cooperation with the rim part at the rear side of the hump and having a turned end for fastening to the cover member, said cover member having its outer peripheral edge rolled and interlocked with the turned end of each of said fingers for fastening the fingers to the cover member.

2. In a wheel structure, a wheel including a body and a multi-flanged drop center rim part, said rim part including an outer generally axially extending flange having a tire bead receiving depressed section which provides a radially inwardly extending hump, and a metallic circular cover member having its outer peripheral portion provided at spaced intervals with rearwardly extending retaining fingers having contact portions for retaining engagement with the rear side of the hump, said contact portions being normally arranged in a circle of a diameter slightly in excess of that of the inner surface of said hump so as to require flexing of the fingers in order for them to pass over the hump and whereby the fingers are under stress when they are in engagement with the rim part, said cover member having its outer edge rolled to reinforce the same at the point of application of a pry-off force and said fingers being secured to the outer portion of the cover member solely by said rolled outer edge and having free extremities positioned directly to the rear of said rolled edge.

3. As an article of manufacture, a wheel cover member made of sheet metal and having an outer rolled edge and having interlocked with its edge a plurality of circumferentially spaced rearwardly extending cover retaining fingers, each of said fingers having a free end humped radially outwardly and in a circle of a diameter slightly in excess of the diameter of the surface of the wheel to be engaged by the fingers so as to require flexure of the fingers in order for them to be moved into retaining cooperation with the wheel as the cover member is pressed home on the wheel, and each of said fingers also having an end formed into an eyelet about which said outer edge is rolled to interlock the cover member therewith.

GEORGE ALBERT LYON.